United States Patent
Tanaka et al.

(10) Patent No.: US 7,190,873 B2
(45) Date of Patent: *Mar. 13, 2007

(54) WIRING DEVICE FOR OPTICAL FIBER

(75) Inventors: Satoru Tanaka, Tsu (JP); Masaru Yoshida, Tsu (JP); Jun Tokuda, Osaka (JP); Yasuichi Kinekawa, Osaka (JP); Toshifumi Sakamoto, Osaka (JP); Yoshihiro Shogaki, Osaka (JP); Hiroaki Okada, Osaka (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/060,284

(22) Filed: Feb. 18, 2005

(65) Prior Publication Data

US 2005/0220435 A1    Oct. 6, 2005

(30) Foreign Application Priority Data

Feb. 20, 2004   (JP) .............................. 2004-045299

(51) Int. Cl.
    *G02B 6/00*   (2006.01)
(52) U.S. Cl. ...................................... 385/134; 385/135
(58) Field of Classification Search ...................... None
    See application file for complete search history.

(56) References Cited

U.S. PATENT DOCUMENTS 6,607,303 B2 * 8/2003 Ngo et al. .................... 385/53

2005/0213920 A1 * 9/2005 Tanaka et al. ............... 385/135

FOREIGN PATENT DOCUMENTS

JP           2793183         6/1998

OTHER PUBLICATIONS

English language Abstract of JP 2793183, Oct. 25, 1988.
U.S. Appl. No. 11/060,286 to Tanaka et al., which was filed Feb. 18, 2005.

* cited by examiner

*Primary Examiner*—Sung Pak
*Assistant Examiner*—Hoang Tran
(74) *Attorney, Agent, or Firm*—Greenblum & Bernstein, P.L.C.

(57) ABSTRACT

There is provided wiring device for optical fiber capable of increasing the performance of construction work. A cover 2 is disposed in an aperture formed at front surface of the plug receptacle main body 1, the upper end thereof is rotatably supported to the plug receptacle main body 1, and a receptacle 3 is attached to the rear surface side of the cover 2. The receptacle 3 has a plug connection hole facing an outer surface side of a building at least at a used state and a plug connection portion into which a first optical-fiber plug being attached to the optical fiber cable wired to the inside of the building is inserted and connected, and optically connects the first optical fiber being connected to the plug connection portion and a second optical-fiber plug inserted from the outer surface side of the building through the plug connection hole. A notch 14 for inserting the first optical-fiber plug is formed at a sidewall 11b of the plug receptacle main body 1 which is located in the inserting direction of the optical fiber plug inserted and connected to the plug connection portion.

12 Claims, 11 Drawing Sheets

(a)

(b)

WIRING DEVICE FOR OPTICAL FIBER

BACKGROUND OF THE INVENTION (a) Field of the Invention

The present invention relates to a wiring device for optical fiber, which uses an optical plug receptacle for connecting an optical fiber cable introduced inside the wall or under the floor of a building.

(b) Description of the Related Art

Conventionally, a wiring device for optical fiber in which an optical fiber cable wired inside a building is introduced into a flush box laid in the wall surface of the building and an optical plug receptacle being attached to a flush box using a mounting frame standardized based on a flush type wiring device is used is disclosed (for example, see Japanese Examined Patent Application Publication No. 2,793,183).

In the above-mentioned wiring device for optical fiber, there is a problem in that, even though the optical fiber plug is not connected to the optical plug receptacle from the outer surface side of the building, the optical plug receptacle is projected forward more than the front surface of the wiring device, which causes an obstruction.

There is also conventionally disclosed the wiring device for optical fiber, comprising: a rotatable retainer with the optical plug receptacle attached at the rear surface side being disposed at an aperture formed at the front surface of the plug receptacle main body such that the optical plug receptacle can be received in the plug receptacle main body at non-used state, wherein the rotatable retainer is rotatably supported to the plug receptacle main body so as to keep a projected state in which the rotatable retainer is projected toward the front side from the front surface of the plug receptacle main body to face a plug connection hole toward outward of the plug receptacle main body or a received state in which a plug connection hole is received in the plug receptacle main body; pressing means for normally pressing the rotatable retainer toward the front side; retaining means for retaining the received state; and a pop-up mechanism for projecting the optical plug receptacle toward the front side when the maintenance of the retaining means is released.

The optical plug receptacle used in the above-mentioned wiring device for optical fiber comprises a plug connection portion into which an optical fiber plug attached to an optical fiber cable wired to the inside of a building is inserted and connected. The optical plug receptacle optically connects an optical fiber plug inserted through a plug connection hole from the outer surface side of a building and the optical fiber plug connected to the plug connection portion. However, the optical plug receptacle is attached to the rear side of the rotatable retainer such that, when the plug receptacle main body is attached to a attaching surface in the normal direction, the plug connection hole faces the downward direction (that is, the direction of insertion into the plug connection hole is nearly in parallel with the front surface of the plug receptacle main body). As a result, when the optical fiber plug is inserted into and connected to the plug connection portion of the optical plug receptacle, this operation is obstructed by the transverse wall of the plug receptacle main body, which it is impossible to carry out a connection work of the optical fiber plug, thereby leads to deterioration in the performance of construction work.

SUMMARY OF THE INVENTION

The present invention is contrived to solve the above problems, and it is an object of the present invention to provide wiring device for optical fiber capable of improving the performance of construction work.

In a first aspect of the present invention, there is provided wiring device for optical fiber, the wiring device comprises a plug receptacle main body which is mounted on a mounting opening opened in the outer surface of a building; and a receptacle for optical fiber attached to the plug receptacle main body and having a plug connection hole facing an outer surface side of the building at least at a used state and a plug connection portion into which a first optical-fiber plug attached to the optical fiber cable wired to the inside of a building is inserted and connected, and optically connecting the first optical-fiber plug connected to the plug connection portion and the second optical-fiber plug inserted from the outer surface side of the building through the plug connection hole, wherein a notch for inserting the first optical fiber plug is formed at a portion of the plug receptacle main body which is located in the inserting direction of the first optical fiber plug inserted and connected to the plug connection portion.

In a second aspect according to the first aspect of the invention, the receptacle for optical fiber is attached to the plug receptacle main body, with an insertion hole of the plug connection portion being backwardly inclined with respect to the front surface of the plug receptacle main body.

In a third aspect according to the first aspect of the invention, the wiring device for optical fiber further comprise a rotatable retainer to which the receptacle for optical fiber is attached at the rear surface side thereof and rotatably supported to the plug receptacle main body so as to keep in either of a projected state forwardly projecting from the front part of the plug receptacle main body to face the plug connection hole toward the outside of a building or a received state in which the plug connection hole is received in the plug receptacle main body; and a pop-up mechanism including pressing means for pressing the rotatable retainer to the front side of the plug receptacle main body and retaining means for retaining the received state, and projecting the rotatable retainer to the front side of the plug receptacle main body by the pressing force of the pressing means when the retaining by the retaining means is released.

In a fourth aspect according to the third aspect of the invention, a pressing member for interposing and retaining the receptacle for optical fiber between the rear surface of the rotatable retainer and the pressing member is attached to the rotatable retainer, and a hooking portion hooked to a hooked portion disposed at the plug receptacle main body at the projected state is provided to the pressing member.

In a fifth aspect according to the fourth aspect of the invention, the pressing member is made of a metal material.

In a sixth aspect according to any one of the aspects 3 to 5 of the invention, the rotatable retainer includes a first covering portion to which the receptacle for optical fiber is attached at the rear surface side thereof and whose one end is rotatably supported to the plug receptacle main body, and second covering portions being protruded from the rear side of the first covering portion and each covering both the left and right sides of the receptacle for optical fiber, the rotatable retainer further including: an engagement claws, which is formed on the outside surfaces of the second covering portions, regulating the forward movement of the first covering portion on engaging with claws formed in the plug receptacle main body at the projected state; and a reinforcing member contacting the rear side portions of the second covering portions and supporting the second covering portions.

In a seventh aspect according to the sixth aspect of the invention, the reinforcing member is made of a metallic material.

In an eighth aspect according to any one of aspects 3 to 5, the rotatable retainer includes a first covering portion to which the receptacle for optical fiber is attached at the rear surface side thereof and whose one end is rotatably supported to the plug receptacle main body, and second covering portions being protruded from the rear side of the first covering portion and each covering both the left and right sides of the receptacle for optical fiber, the rotatable retainer further including: an engagement claws, which is formed on the out-side surfaces of the second covering portions, regulating the forward movement of the first covering portion on engaging with claws formed in the plug receptacle main body at the projected state; and contact surfaces between the engagement claws and the claws formed in the plug receptacle main body to be engaged with the engagement claw are inclined in the direction engaged each other at the time of moving forwardly the rotatable retainer.

BRIEF DESCRIPTION OF THE DRAWINGS

The above and other features and advantages of the present invention will become more apparent by describing in detail exemplary embodiments thereof with reference to the attached drawings in which:

FIGS. 3A to 3D are views illustrating a state in which the wiring device for an optical fiber according to an embodiment of the present invention are received, in which FIG. 3A is a front view, FIG. 3B is a side view, FIG. 3C is a bottom view, and FIG. 3D is a sectional view taken along a line B—B;

FIGS. 7A to 7C are views illustrating a projected state of wiring device for an optical fiber according to an embodiment of the present invention, in which FIG. 7A is a front view, FIG. 7B is a sectional view taken along a line C—C, and FIG. 7C is a sectional view taken along a line D—D;

FIGS. 10A and 10B are views illustrating wiring device for an optical fiber according to an embodiment of the present invention, in which FIG. 10A is a sectional view taken along a line A—A with a part of FIG. 3A omitted.

DETAILED DESCRIPTION OF THE EMBODIMENTS

Hereinafter, embodiments of the present invention will be described in detail with reference to the FIGS. 1 to 11 such that the embodiments can be easily put into practice by those skilled in the art. However, since the present invention can be embodied in various forms, the present invention is not limited to the embodiments described below.

Further, in the detailed description of the present invention to be described below, if it is not specifically mentioned, in case that the left, right, top and bottom directions are prescribed, the front face of FIG. 3A becomes the front side. Therefore, the right edge of FIG. 3B becomes the rear end.

Figure 1:
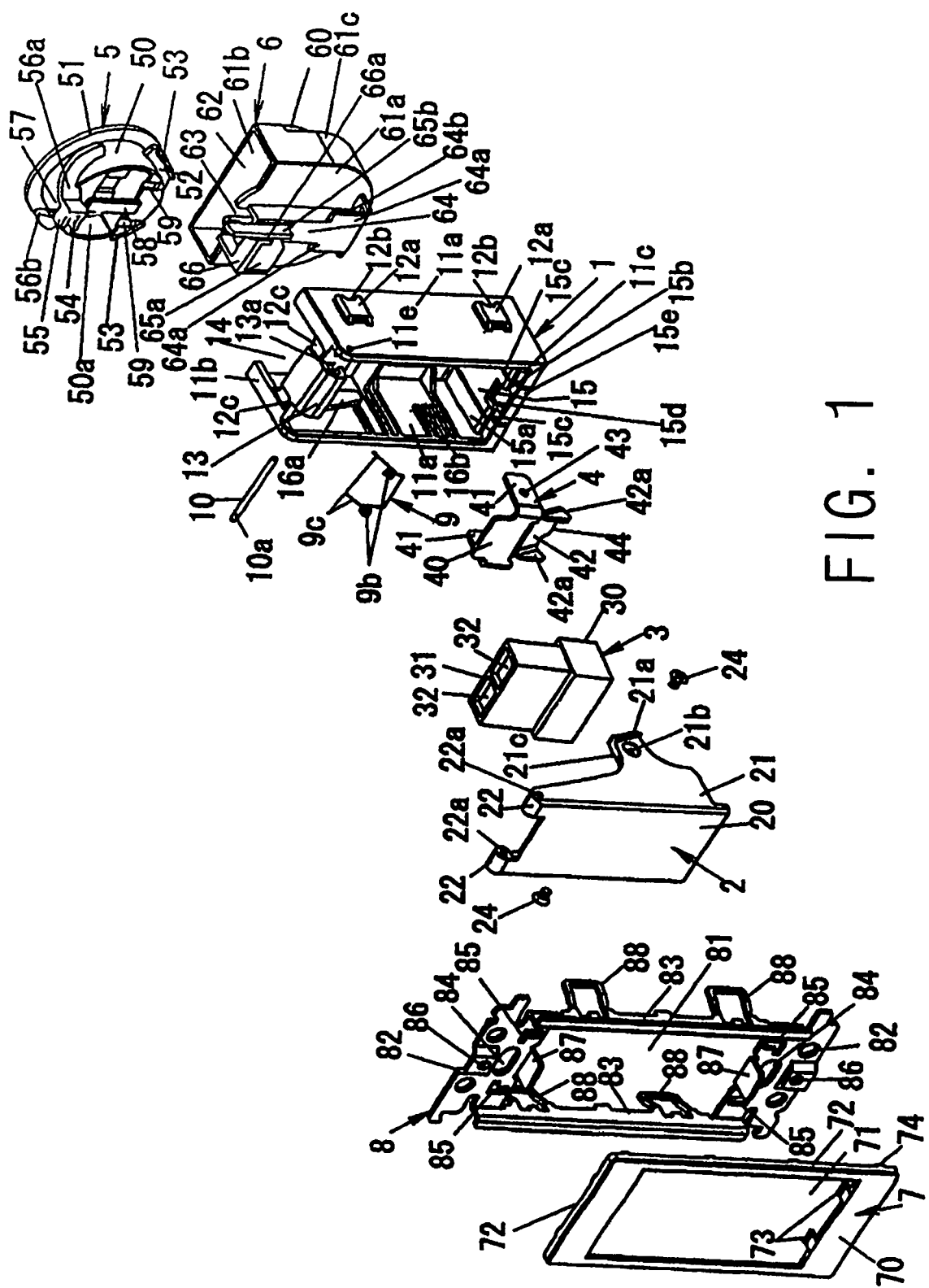
FIG. 1 is an exploded perspective view illustrating wiring device for an optical fiber according to an embodiment of the present invention as seen from a front side.
Figure 2:
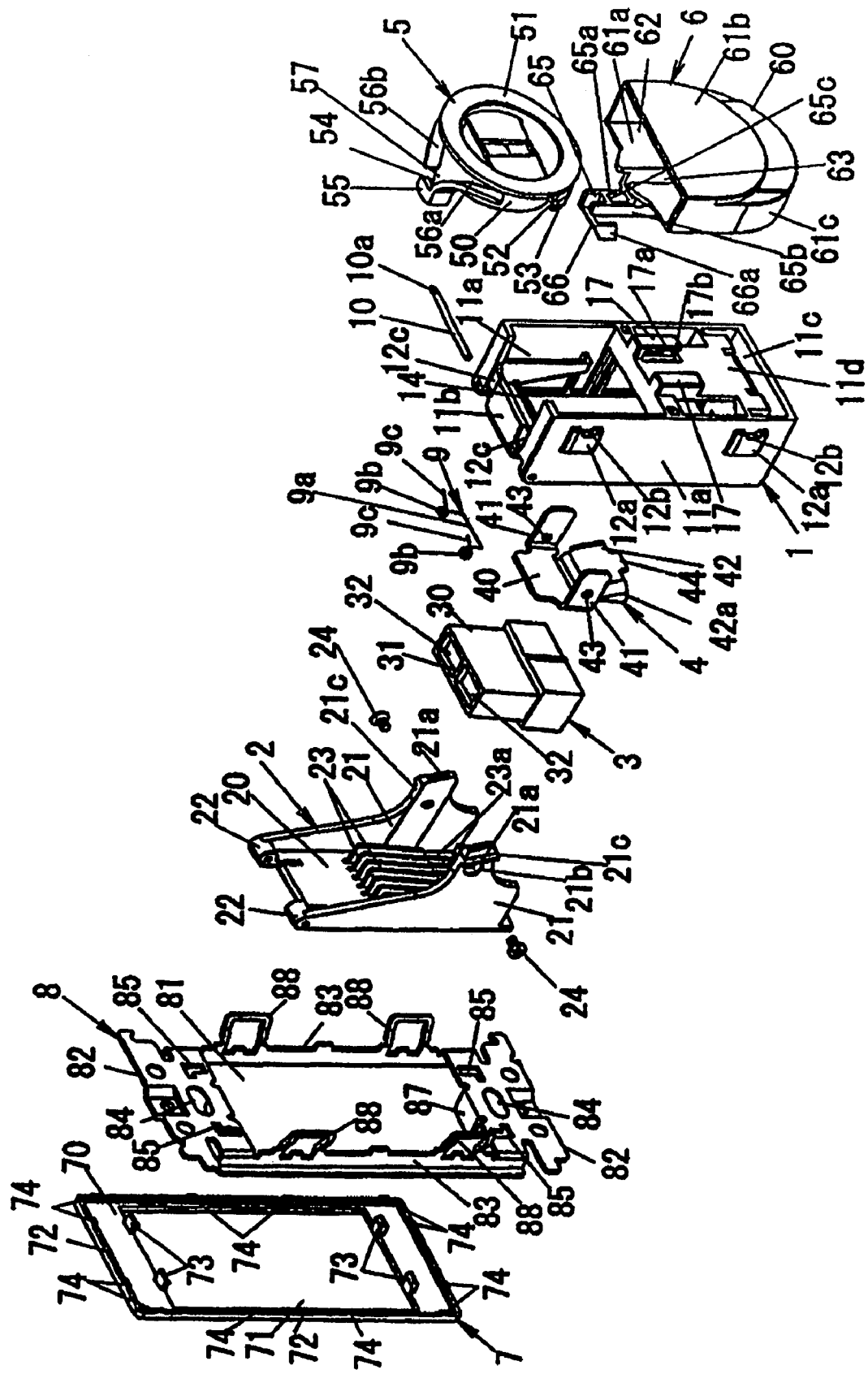
FIG. 2 is an exploded perspective view illustrating wiring device for an optical fiber according to an embodiment of the present invention as seen from a rear side.
Figure 3:
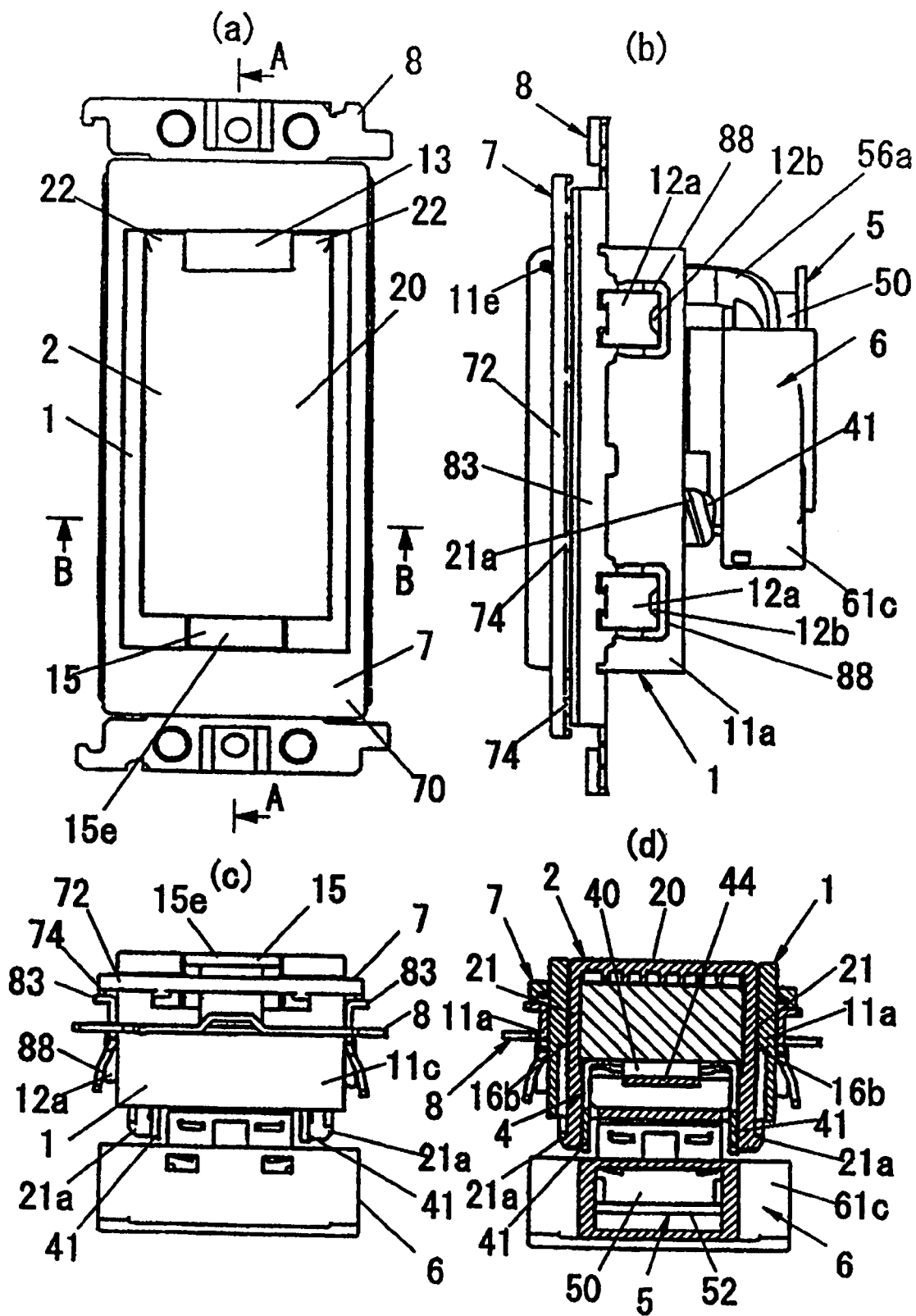
Figure 4:
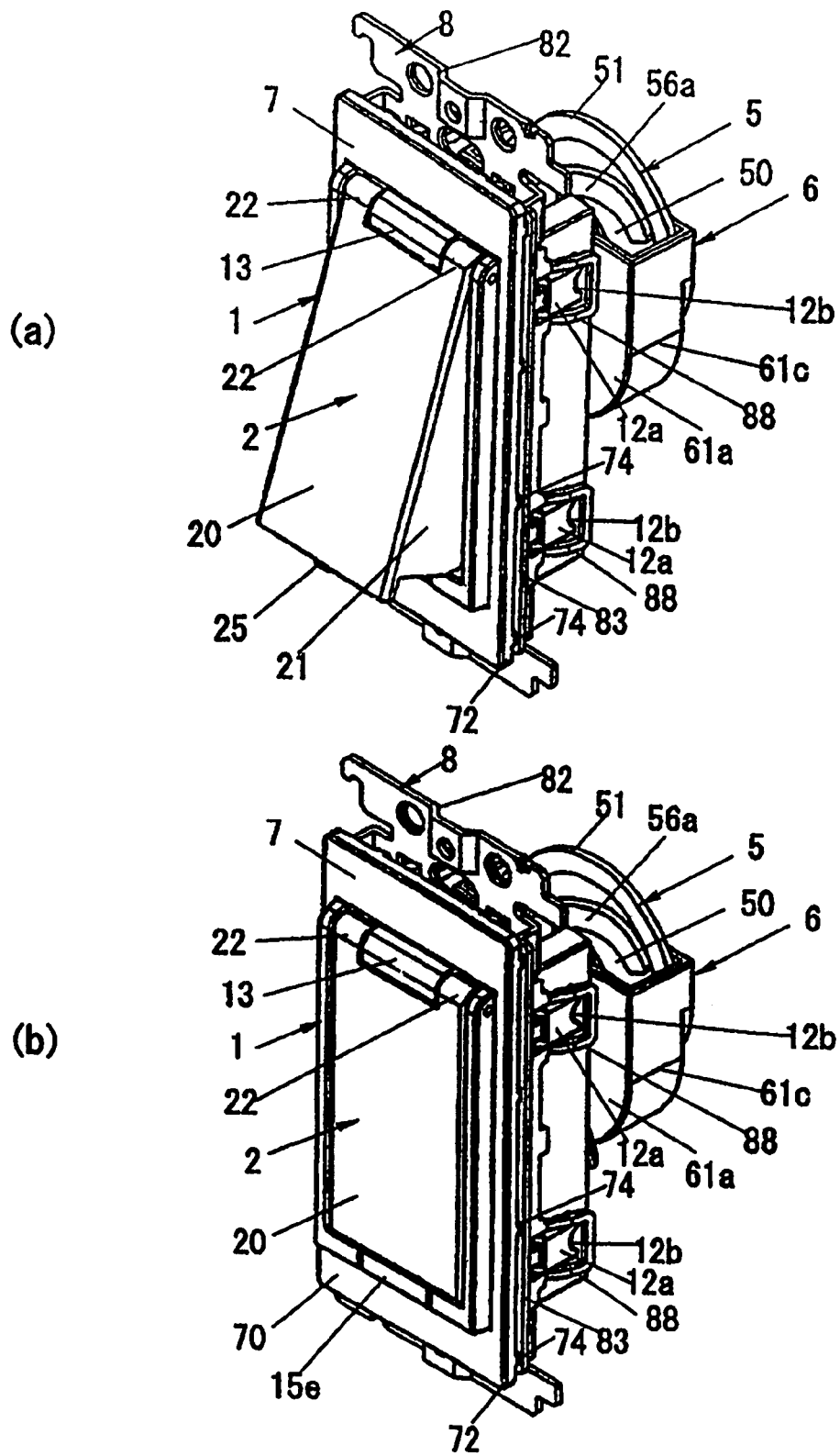
FIGS. 4A and 4B are an external perspective views illustrating wiring device for an optical fiber according to an embodiment of the present invention as seen from a front side.

As shown FIGS. 1 to 3, a wiring device according to an embodiment of the present invention comprises a aperture 81 having the same dimensions as a mounting frame to which three wiring devices of one module having a diagonal shape standardized according to JIS is attached, a metallic mounting frame 8 being fixed into an mounting opening opened at an outer surface of a building, a plug receptacle main body 1 having the dimensions of three modules and being attached to the mounting frame 8, a rotatable cover 2 (rotatable retainer) which is rotatably supported so as to open and close an opening formed at the front surface of the plug receptacle main body 1, a receptacle 3 for optical fiber (hereinafter, refer to a receptacle) being attached to the rear surface side of the cover 2, a pressing plate 4 fixing the receptacle 3 to the cover 2, a winder 5 winding an optical fiber cable to which an optical fiber plug being connected to the receptacle 3 is attached, a retainer 6 receiving and retaining the winder 5, and a decoration cover 7 being attached to the front side of the plug receptacle main body 1.

In the plug receptacle main body 1, four sides in the left, right, top, and bottom directions thereof are surrounded by the side walls 11a, 11a, 11b and 11c, the nearly half of upper portion thereof is opened in the forward and backward directions, and the nearly half of lower portion thereof is made of a synthetic-resin molded body with the rear part 11d integrally formed. Further, on the rear-side outer surfaces of the left and right side walls 11a, 11a, two hooking protrusions 12a being hooked to a hooking frame piece 88 of the mounting frame 8 to be described below protrude from the both upper and lower sides, respectively, and on front-side outer surfaces of the top and bottom side walls 11b and 11c, two hooking recesses 12c to which elastic hooking pieces 73 of a decoration cover 7 to be described below are hooked are formed at both left and right sides, respectively. Further, on the front-side portion of the topside wall 11b, a bearing unit 13 for rotatably supporting the cover 2 is formed, and on the rear-side portion of the topside wall 11b, a notch 14 into which an optical fiber plug being connected to the receptacle 3 is inserted is formed (refer to FIG. 9).

Further, a cross piece of a protrusion piece 15a having an 'L' shaped section to be erected from the lower-side edge of the rear part 11d toward the front side is connected to the front-side edge of the lower side wall 11c. A stepped portion 15b is formed on the front portion of the protrusion piece 15a, in which the front portion of the protruding piece 15a is lower than the rear portion of the protruding piece 15a by one step due to the stepped portion 15b. Further, on both left and right sides of the protruding piece 15a, two slits 15c opened toward the front-end side are formed in the front-rear direction to the rear part 11d. A flexible piece 15 is inserted into the slits 15c, 15c such that the rear edge thereof is connected to the rear part 11d and the front edge thereof is flexible to the thickness direction (vertical direction). Further, a hooking hole 15d is formed in the front-side portion of the flexible piece 15 so as to penetrate the flexible piece 15 in the thickness direction along the stepped portion 15b and to hook to/detachable from a hooking protrusion piece 25 protruding to a center portion of the lower end portion of the cover 2 or a hooking protrusion piece 44 protruding to a center portion of a lower end of the pressing plate 4.

Further, ribs 16a, 16a are formed on inner side surfaces of the left and right side walls 11a, 11a from connection portions between the top side wall 11b and the left and right side walls 11a to nearly center portions in a vertical direction so as to contact the rear edges of both side portions of the cover 2 at the time of receiving the cover 2, and each rib 16a has an inclined surface which backwardly retracts from the top portion to the bottom portion thereof. Further, on each lower portion of inner side surfaces of the left and right side walls 11a, 11a, a plurality of ribs 16b protruding from the front edge of the side wall 11a toward the rear side is formed so as to engage with engaging claws 21 disposed at both side portions 21 of the cover 2 when the cover 2 is projected to the front side.

Further, supporting portions 17 for supporting a retainer 6 are integrally formed at both left and right sides on the upper-end of rear surface of the rear part 11d. Each supporting portion 17 has a supporting groove 17a whose side surface opposing each other and lower end is opened. The retainer 6 is detachably attached to the rear surface of the rear part 11d by the holding groove 17a.

As shown in FIGS. 1 and 2, the cover 2 is made of a synthetic-resin molded body in which the front part (a first covering portion) 20 having a rectangular shape, side parts (second covering portions) 21,21 extending from both edges of the first covering portion to the rear side along the rotational direction of the front part 20 and having a fan-like shape, leg pieces 21c, 21c protruding from the rear edges of the lower portion of the second covering portions 21,21 to the rear side and shaft supporting portions 22,22 formed so as to upwardly protrude on both sides of an upper end of the front portion 20 are integrally formed. The cover 2 constitutes a reception unit for receiving and retaining the receptacle 3 at a space between the rear surface of the first covering portion 20 and each second covering portion 21,21. The shaft supporting portions 22,22 has a cylindrical shape, the shaft direction thereof is approximately in parallel with a left-right direction, and shaft holes 22a into which both ends of a rotational shaft are inserted are formed in the manner of penetration at each center portion of the shaft supporting portions 22. After a spring member 9 is received in a bearing recess 13a of the bearing unit 13 of the plug receptacle main body 1 and the bearing unit 13 of the plug receptacle main body 1 is interposed between the shaft supporting portions 22,22, the rotation shaft 10 is inserted into a shaft hole 11e formed in the one side wall 11a of the plug receptacle main body 1, the shaft hole 22a of the one shaft supporting portion 22, the bearing recess 13a of the bearing unit 13, the shaft hole 22a of the other shaft supporting portion 22 and the shaft hole 11e of the other side wall 11a in this order, so that the upper end of the cover 2 is rotatably supported with respect to the plug receptacle main body 1. The spring member 9 always presses the lower end of the cover 2 onto the front side. Further, a center portion of the spring member 9 is bent in a 'U' shape, and twisted portions 9b, 9b are formed at both ends of the spring member 9.

Further, a plurality of supporting ribs 23 contacting the front surface of a housing 30 of the receptacle 3 protrudes from the rear surface of the first covering portion 20 in parallel with the second covering portions 21 between the second covering portions 21,21. Each supporting rib 23 is formed such that the protruded length thereof gradually increases as it goes to the upper side. Further, a stepped portion 23a is formed at the lower portion of each supporting rib 23 in conformity with the surface shape of the housing 30. Each engagement claw 21a, 21a engaging with the ribs 16b of the plug receptacle main body 1 outwardly protrudes from the rear ends of the leg pieces 21c, 21c of the cover 2. Each penetrating hole 21b into which a screw 24 for fixing the pressing plate 4 is inserted is formed in the leg pieces 21c.

The housing 30 of the receptacle 3 is comprised of a hollow member being made of a synthetic-resin molded body and having a rectangular parallelepiped shape. In the housing 30, an outer circumference surface of a front portion (which is a lower part at the time of attaching it to the cover 2) side is protruded from an outer circumference surface of the rear portion (which is the upper part at the time of attaching it to the cover 2) side. Further, an inside space of the housing 30 is partitioned into a left and a right receiving chambers 32,32 by a partition wall 31. Here, the upper side portion of receiving chamber 32 becomes a first plug connection portion to which a first optical-fiber plug 103 being attached to an optical fiber cable which is wired inside of building is connected, the lower side portion of receiving chamber 32 become a second plug connection portion to which a second optical-fiber plug (not shown) being inserted through a lower side hole (plug connection hole) of the housing from outer surface side of the building is connected, and a sleeve (not shown) for optically connecting the both plugs by arranging and holding a ferrule of the optical fiber plug being connected to the first and second plug connection portions is disposed at an intermediate portion of each receiving chambers 32.

Processes of drawing and bending a metal plate form the pressing plate 4. In the pressing plate 4, a contact piece 40 having a rectangular plate shape and contacting the rear surface of the housing 30 of the receptacle 3, supporting pieces 41,41 backwardly protruding from both the lower left and right edges of the contact piece 40, an inclined piece 42 downwardly protruding from the center of the lower side edge of the contact piece 40, and contact pieces 42a, 42a forwardly protruding from both the left and right edges of the inclined piece 42 are integrally formed. A tapped hole 43 into which the screw 24 is inserted is formed in an intermediate portion of each of supporting pieces 41, and the leading ends of the supporting pieces 41 extend to a position opposing the rear surface of the rear end of the leg piece 21c of the cover 2 (that is, the rear surface of the engagement claw 21a). Further, the hooking protrusion piece 44 being hooked into the hooking hole 15d of the flexible piece 15 downwardly protrudes from the center of the lower side edge of the inclined piece 42.

As shown in FIGS. 1 and 2, the winder 5 has a winding body 50 being made of a synthetic-resin molded body and having a flat cylindrical shape. On the outer circumferential surface of the winding body 50, a flange 51 protruding in the radial direction from the entire circumference of the rear end of the winding body 50 is integrally formed, and a flange 52 protruding in the radial direction from the lower-side portion of an intermediate portion of the front-back direction is integrally formed. Further, protrusion pieces 53,53 which are in parallel with the outer circumferential surface of the winding body 50 are formed integrally with the both left and right sides of the outer circumferential portion of the flange 52 toward the front side. A protrusion piece 54 forwardly protruding from the upper front edge of the winding body 50 is formed integrally therewith. The protrusion piece 54 is formed such that the width thereof along the peripheral direction decreases as it goes to the front side, and a pressing piece 55 which is bent in an 'L' shape in paralleled a leading end thereof with the protrusion piece 54 is formed integrally with one side edge of the front-side portion of protrusion piece 54 toward the outside. Further, drawing walls 56a and 56b protruding from the connection portion with the protrusion piece 54 in the outer circumferential direction up to an intermediate position in the front-back direction are integrally formed on the upper-side of outer circumferential surface of the winding body 50, and each drawing walls 56a and 56b is curved in a circular arc shape such that the interval therebetween broadens out as it goes to the rear side. Further, the front end of the one drawing wall 56a is formed integrally with the pressing piece 55. A recess 50a, which is backwardly recessed, is formed on the center portion of the front end of the winding body 50, and a knob 58 linked between the upper edge and the lower edge of the recess 50a is formed integrally with the winding body 50. Further, the knob 58 forwardly protrudes more than the front end of the winding body 50. In the lower side portion of the front end surface of the winding body 50 hooking recesses 59,59 to which a claw (not shown) being formed on the inner side surface of the retainer 6 to be described below is hooked are formed on both the left and right sides of the winding body 50.

In the outer circumferential surface of the winding body 50, a portion located closer to the front side than the flange 52 constitutes a clad retainer. The optical fiber cable of which the clad is not peeled-off is inserted into the clad retainer, and the clad is inserted and maintained between the protrusion piece 53 protruded from the flange 52 and the outer circumferential surface of the winding body 50, so that the clad of the optical fiber cable is fixed. Core wire of the optical fiber cable of which the clad is peeled-off is introduced to the winding body 50 (winding part) side between the flanges 51 and 52 through the interval between the flange 52 and the drawing wall 56a or 56b, the core wire is wound around the winding body 50, and the core wire of the optical fiber cable is drawn through a drawing groove 57 between the front portions of the drawing walls 56a and 56b to the outside of the winder 5. Such a winding working is performed while gripping the knob 58 formed on the front surface of the winding body 50 by hand. The outer circumferential surface of the winding body 50 has the radius of curvature larger than the permitted minimum radius of curvature in which the signal transmitting characteristic of the wound optical fiber cable (for example, the optical fiber cable made of glass fiber) does not deteriorate so as not to affect the signal transmitting characteristics of the wound optical fiber cable. Further, an inner circumferential surface of the corner of the drawing walls 56a and 56b which is located at both sides of the drawing groove 57 also is comprised of an R-curved surface having the radius of curvature larger than the permitted minimum radius of curvature of the wound optical fiber cable so as not to affect the signal transmission characteristics of the optical fiber cable drawn along the drawing walls 56a and 56b. The surfaces of the winding body 50, the flanges 51 and 52 and the drawing walls 56a and 56b are preferably made to a slidable surface by a soldering, glazing, etc., such that the clad or core wire of the wound optical fiber cable can be rotated thereon to decrease tensile force.

Further, as shown in FIGS. 1 and 2, the retainer 6 which receives the winder 5 and is detachably attached to the plug receptacle main body 1 is made of a synthetic-resin molded body, and comprises a housing 60 which is a hollow member whose lower opening is blocked by a bottom wall. The front and rear side walls 61a and 61b of the housing 60 is configured such that a semi-circular part protrudes from a bottom side of a rectangular shape horizontally extending, and side walls 61a and 61b are connected to each other by a peripheral wall 61c erected from peripheral edges except the top side. The space surrounded by the sidewalls 61a and 61b and the peripheral wall 61c serves as a receiving portion 62 for receiving the winder 5. A guide groove 63 which is opened toward the top side is formed on the front side wall 61a of the housing 60 in the vertical direction, and the knob 58 forwardly protruding from the front surface of the winding body 50 is inserted into the guide groove 63, so that the winder 5 is inserted into the receiving portion 62 while being guided. Protruding die 64 protruding from the intermediate position in the left-right direction toward the front side is formed on the front surface side of the sidewall 61a. Hooking piece 64a which is hooked to the holding groove 17a of the plug receptacle main body 1 protrudes from the both left and right sides of the lower front end of the protruding die 64 in side directions, respectively, and hooking protrusion 64b which is hooked to a hooking recess 17b formed concavely on the surface of the supporting groove 17a protrudes from the rear surface of each hooking piece 64a. Further, protruding pieces 65a and 65b protruding from both the left and right edges toward the front side are integrally formed on the upper front end of the protruding die 64, and both the protruding pieces 65a and 65b are formed up to the height of the drawing walls 56a and 56b formed in the winder 5 when the winder 5 is received in the receiving portion 62. Further, the section of both protruding piece 65a and 65b is formed in a circular arc shape such that, in the interval between both the protruding pieces 65a and 65b, the interval at the rear end is nearly equal to the width of the front end of the drawing groove 57, and the interval broadens out as it goes to the front side. The one (left) protruding piece 65a protrudes more than the other (right) protruding piece 65b up to the front side. On the opposing surfaces of both the protruding pieces 65a and 65b, a bottom wall 65c is formed to connect between the opposing surfaces of both the protruding pieces 65a and 65b. When the winder 5 is received in the receiving portion 62, the bottom wall 65c is continued to the bottom surface of the drawing groove 57 formed on the winder 5. A pressing piece 66 parallel with the bottom wall 65c extends from the front side portion of the top end of the one protruding piece 65a, and a hooking portion 66a downwardly protruding is formed integrally with the leading end of the pressing piece 66. The space surrounded by the protruding pieces 65a and 65b and the bottom wall 65c becomes the guiding groove 65.

Here, the interval of the peripheral wall 61c in the left-right direction is slightly larger than the outer diameter of the flange 51 of the winder 5, the retainer 6 is made to a small-sized unit, and the optical fiber cable wound on the received winder 5 is regulated not to increase more than necessary while the permitted minimum radius of curvature thereof being maintained when the winding diameter of the cable increases due to the outward elastic force. A stepped portion 61d which is coupled to the lower-side semicircle portion of the flange 51 formed in the winder 5 is formed on the inner surface of the side wall 61b, the lower semicircle portion of the flange 51 contacts the stepped portion 61d, and the lower end of the knob 58 contacts the lower end of the guide groove 63, so that it is possible to secure a receiving space 67 for the core wire of the optical fiber cable between the winder 5 and the lower portion of the receiving portion 62 when the winder 5 is received in the receiving portion 62 (refer to FIG. 6). Therefore, it is possible to receive the remaining portion of the core wire in the receiving space 67 to shorten the remaining portion of the core wire protruding to the outside of the winder 5. As a result, it is possible to reliably protect the core wire of the optical fiber cable.

The decoration cover 7 is made of a synthetic-resin molded body in which a rectangular frame-shaped front portion 70 having a vertically elongated aperture 71 into which the front end portion of the plug receptacle main body 1 is inserted and a side portion 72 backwardly protruding from the peripheral edge of the front portion 70 are integrally formed. On the rear surface of the front portion 70, two elastic hooking pieces 73 which is hooked to the hooking recess 12c of the plug receptacle main body 1 are formed at each of the upper and the lower edges of the aperture 71. A plurality of protrusions 74 contacting the front end surface of side pieces 83 of the mounting frame 8 to be described below protrudes from each rear edge of the side portion 72 with a predetermined interval from each other.

The mounting frame 8 is formed in a shape of a rectangular frame in which opening 81 with the same dimensions as that of a mounting frame for big square type interchangeable wiring device is formed at the center thereof. In each side piece 82 disposed oppositely from each other in the longitudinal direction, an elongated hole 84 into which a box screw for attaching the mounting frame 8 to a flush box (not shown) is inserted, attachment holes 85 to which inserting members (not shown) conventionally known are inserted for attaching the mounting frame 8 to a structural element of walls such as a gypsum board, and a tapped hole 86 for plate screw for attaching a plate frame (not shown) etc. to the front surface are at least formed. Further, contact pieces 87,87 forwardly protruding to contact the upper and lower sidewalls 11b and 11c of the plug receptacle main body 1 are formed at side edges of the side pieces 82,82, which face the aperture 81. On the other hand, each side piece 83,83 opposing each other in the width direction of the mounting frame 8 is bent at a nearly right angle toward the rear side, and front ends portions of the side pieces 83,83 are outwardly bent in the left-right direction at a nearly right angle. Further, on the rear edges of the side pieces 83,83, two hooking frame pieces 88 having 'U' shape which are hooked to the hooking protrusions 12a of the plug receptacle main body 1 are integrally formed at each of the upper and lower sides.

Hereinafter, a method of assembling the wiring device for optical fiber according to the present invention will be described in detail.

First, in the receiving portion surrounded by the first covering portion 20 and the second covering portions 21,21 of the cover 2, the receptacle is inserted after the direction of the housing 30 is aligned to contact the front surface of the housing 30 with the ribs 23 protruding from the rear surface of the first covering portion 20. At this time, the step portions 23a of the ribs 23 contact the stepped portion of the housing 30, and the ribs 23b extending toward the rear side from the lower-side portion of the ribs 23 contact the front surface of the lower-side portion of the housing 30, so that the housing 30 is located in the cover 2. At this state, the contact piece 40 of the pressing plate 4 is contacted to the upper rear surface of the housing 30, and the contact pieces 42a is contacted to the lower rear surface of the housing 30. Then, the screw 24 passed through the penetrated hole 21b of the leg piece 21c is inserted into the tapped hole 43 formed in the supporting piece 41 of the pressing plate 4 to fix the pressing plate 4 to the cover 2, so that the receptacle 3 is placed between the pressing plate 4 and the cover 2 (refer to FIGS. 8b and 8d). At this time, since the leading ends of the supporting pieces 41 of the pressing plate 4 are located at the rear-side portion than the portion from which the engagement claws 21a of the covering portion (comprised of the second covering portions 21 and the leg pieces 21c) protrude, the force inwardly pressing the covering portion can be received by the supporting pieces 41 of the pressing piece made of metal material.

Next, at the time of combining the plug receptacle main body 1 with the cover 2, the center piece of the center portion 9a of the spring member 9 is hooked to the lower portion of the bearing unit 13 of the plug receptacle main body 1, and both twisted portion 9b, 9b of the spring member 9 is inserted into the recess (not shown) formed on both ends of the bearing unit recess 13a to communicate both end of the bearing unit recess 13a with opened holes of the twisted portions 9b, 9b. Next, the cover 2 is disposed at the front side of the plug receptacle main body 1 so as to interpose the bearing unit 13 between the shaft supporting portions 22,22 of the cover 2, and the rotation shaft 10 is inserted into the shaft hole lie formed in the one side wall 11a, the shaft hole 22a of the one shaft supporting portion 22, the opened hole of the one twisted portion 9b, the bearing recess 13a of the bearing unit 13, the opened hole of the other twisted portion 9b, the shaft hole 22a of the other shaft supporting portion 22 and the shaft hole 11e of the other side wall 11a in this order. Here, in the rotation shaft 10, the diameter thereof from the one end of the inserting side to the portion near to the other end is slightly smaller than the inner diameter of the shaft holes lie and 22a and the bearing recess 13a, so that the rotation shaft 10 can be inserted. However, the diameter of the other end 10a is larger than the inner diameter of the shaft hole 11e and a knurling treatment is performed on the outer surface of the rotation shaft 10. Therefore, when the other end 10a is finally pressed into the shaft hole 11e, the rotation shaft 10 is fixed to the plug receptacle main body 1. At this time, each extension part 9c, 9c extending from the twisted portions 9b, 9b of the spring member elastically contacts the rear surface of the first covering portion 20 of cover 2, so that biasing force for rotating the cover 2 from the front part of the plug receptacle main body 1 in the forwardly projecting direction is applied to the cover 2. Specifically, the upper end portion of the cover 2 is rotatably supported to the plug receptacle main body 1 about the rotation shaft 10, and biasing force for rotating the lower end portion of the cover 2 from the front part of the plug receptacle main body 1 in the forwardly projecting direction about the rotation shaft 10 is applied to the cover 2 by the spring member 9.

As described above, the receptacle is mounted on the cover and the cover 2 is attached to the plug receptacle main body 1 to complete the assembling of the wiring device for optical fiber. FIGS. 3A to 3D, 4B and 6 illustrate a state in which the cover 2 is rotated to the front part of the plug receptacle main body 1 against the biasing force of the spring member 9, and the leading end of the hooking protrusion piece 25 formed at the lower end portion of the cover 2 is hooked to the hooking hole 15d by elastic force of the flexible piece 15. At this time, the front surface of the first covering portion of the cover 2 is nearly flush with the front surface of the plug receptacle main body 1, the receptacle 3 attached to the rear surface of the first covering portion 20 is received in the plug receptacle main body 1 in a received state (this state is a non-used state). At this time, the inclined surfaces of the rear edges of the second covering portions 21,21 of the cover 2 contact the front end surfaces of the ribs 16a, 16a formed on the inner surfaces of the side walls 11a, 11a of the plug receptacle main body 1, so that the backward movement of the cover 2 is restricted (refer to FIGS. 10A and 10B).

Figure 6:
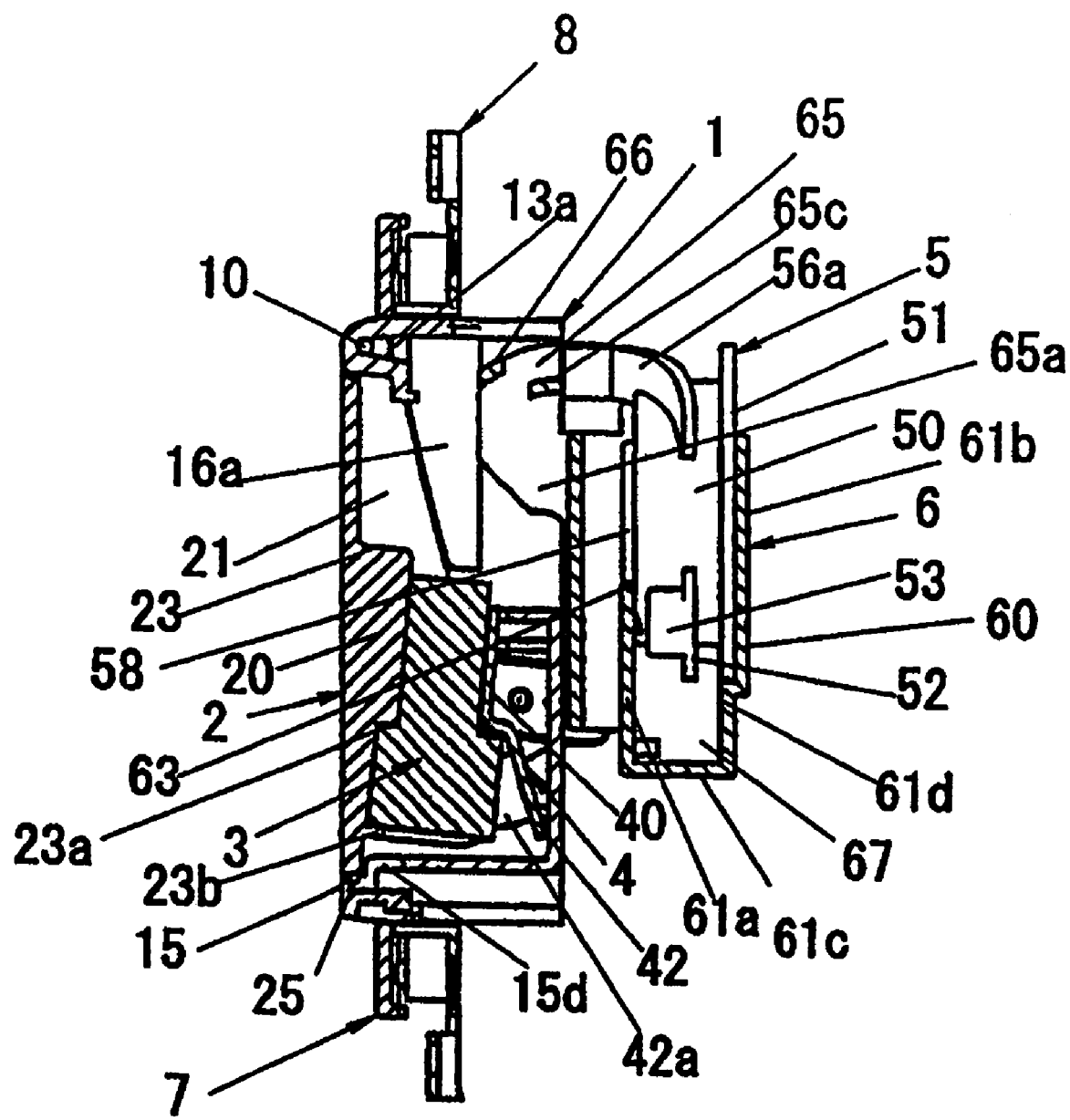
FIG. 6 is a sectional view taken along a line A—A of FIG. 3A illustrating wiring device for an optical fiber according to an embodiment of the present invention.

At this non-used state, when an operating portion 15e of the flexible piece 15 exposed toward the front side of the plug receptacle main body 1 is pressed down, the flexible piece 15 is downwardly bent, and the leading end of the hooking protrusion piece 25 is detached from the hooking hole 15d, so that biasing force of the spring member 9 is applied to the cover 2 to rotate about the rotation shaft 10 in a clockwise direction in FIG. 6. When the lower end of the cover 2 is forwardly rotated, each engagement claw 21a formed on the second covering portions 21,21 of cover 2 is hooked to the rear end portion of the ribs 16b formed on inner side surfaces of the left and right side walls 11a, 11a of the plug receptacle main body 1, so that the forward rotation of the cover 2 is regulated and the cover 2 is forwardly projected from the front part of the plug receptacle main body 1 such that the first covering portion 20 is downwardly inclined, the plug connection hole of the receptacle 3 downwardly faces the outside between the lower end portion of the first covering portion 20 and the front side of the plug receptacle main body 1. This state is a use state in which the plug connection is performed. At this state, the hooking protrusion piece 44 of the pressing plate 4 mounted on the cover 2 is hooked into the hooking hole 15d of the flexible piece 15, and the hooking protrusion piece 44 is hooked to the rear edge of the hooking hole 15d, so that the backward rotation of the cover 2 is restricted and the cover 2 is maintained at a state in which the cover is forwardly projected (refer to FIGS. 7A to 7C and 11).

As described above, the receptacle 3 is interposed and held between the pressing plate 4 and the rear surface of the cover 2. In the pressing plate 4, the hooking protrusion piece 44 (hooking part) which is hooked into the hooking hole 15d (hooked part) of the plug receptacle main body 1 is formed, and the hooking protrusion piece 44 of the metallic pressing plate 4 is hooked into the hooking hole 15d at the projected state, so that the projected state of the cover 2 is maintained. Therefore, when the second optical fiber plug is connected to the plug connection hole of the receptacle 3 from the outside, the position of the plug connection hole (that is, the receptacle 3) does not easily changed, which makes the plug connecting work easy. Further, at a state in which the second optical fiber plug is connected to the plug connection hole, even though force for backwardly biasing the cover 2 is applied, the cover 2 does not close, so that it is possible to prevent the second optical fiber plug from being damaged due to the undesirable state in which the cover 2 is closed and the second optical fiber plug is interposed between the cover 2 and the plug receptacle main body 1. The leading end of the supporting piece 41 of the pressing plate 4 is located at the rear-side position than the portion of the covering portion (comprised of the second covering portions 21 and the leg pieces 21c) from which each engagement claw 21a protrudes, and force inwardly pressing the covering portion is received by the supporting pieces 41 serving as a reinforcing member, so that the cover 2 is not easily deformed although external force is applied to the cover 2 in the left-right direction, and the engagement state between the engagement claws 21a and the ribs 16b does not release. Therefore, it is possible to stably maintain the projection state of the cover 2. The pressing plate 4 is made of metal material, however, the material for the pressing plate 4 is not limited thereto. The pressing plate 4 may be made of a resin-molded body. In the present embodiment, the pressing plate 4 is made of metal material, so that the strength of the pressing plate 4 is enhanced compared to the case in which the pressing plate 4 is made of synthetic resin. Since the hooking protrusion piece 44 and the hooking hole 15d is reliably connected, and the portion of the covering portion in which the engagement claws 21a are formed is reliably supported, it is possible to stably maintain the protrusion state of the cover.

Further, as shown in FIG. 10B, in the engagement claws 21a of the cover 2, each surface which contacts the ribs 16b is configured such that it forwardly protrudes as it goes to the outer side. In the rib 16b (claw to be engaged) of the plug receptacle main body 1, each surface, which contacts the engagement claw 21a, is configured such that it backwardly protrudes as it goes to the inner side. Each contact surface between the engagement claws 21a and the ribs 16b is formed as an inclined surface which is inclined in the engagement direction such that the engagement claws 21a and the ribs 16b are engaged with each other when the cover 2 forwardly moves. Therefore, at the projected state of the cover 2, even though external power for forwardly moving the cover 2 is applied thereto, since the engagement state between the engagement claws 21a and the ribs 16b is hardly released by engaging the engagement claw 21 and the rib 16b each other, it is possible to reliably maintain the projected state of the cover 2.

On the other hand, at the used state described above, when an operating portion 15e of the flexible piece 15 exposed toward the front side of the plug receptacle main body 1 is pressed down to downwardly bend the flexible piece 15, the leading end of the hooking protrusion piece 44 of the pressing plate 4 is detached from the hooking hole 15d. At the state in which the engagement between the hooking protrusion piece 44 and the hooking hole 15d is released, when the lower-side portion of the cover 2 is backwardly pressed (pressed to the front part of the plug receptacle main body 1) against the biasing force of the spring member 9, and the cover 2 is rotated about the rotation shaft 10 in a counter clockwise direction in FIG. 7B, the rear ends of the second covering portions 21 of the cover 2 contact the front end of the ribs 16a formed on the side walls 11a of the plug receptacle main body 1. Therefore, the backward rotation of the cover 2 is regulated. Further, the front end of the hooking protrusion piece 25 formed at the lower end of the cover 2 is hooked into the hooking hole 15d by the elastic force of the flexible piece 15, so that the front surface of the first covering portion 20 of the cover 2 is nearly flush with the front surface of the plug receptacle main body 1, and the receptacle 3 attached to the rear side of the first covering portion 20 is received in the plug receptacle main body 1 in received state.

Figure 5:
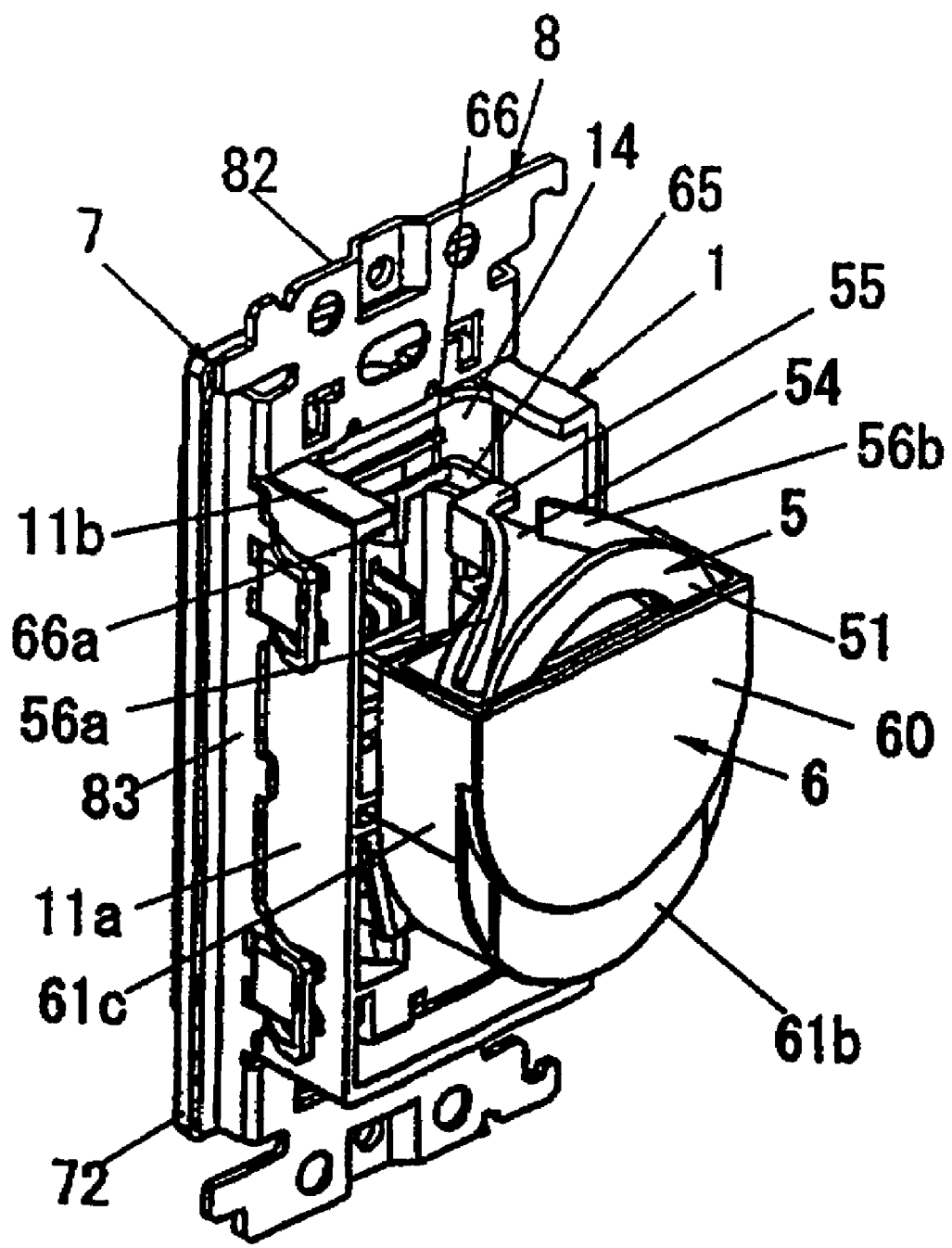
FIG. 5 is an external perspective view illustrating wiring device for an optical fiber according to an embodiment of the present invention as seen from a rear side.

Here, the flexible piece 15 having the operating portion 15e and the hooking protrusion piece 25 of cover 2 constitute retaining means for retaining the received state. This retaining means and the spring member 9 serving as pressing means for pressing the cover 2 to the front side constitute a pop-up mechanism for popping-up the cover 2 and the receptacle 3. In the present embodiment, since the receptacle 3 is attached to the cover 2 that is rotatably supported to the plug receptacle main body 1, at a non-used state, the receptacle 3 is received in the plug receptacle main body 1. Therefore, the receptacle 3 is not obstructed. Further, at a used state, the receptacle 3 is projected to the front side. Therefore, it is easy to connect the plug for optical fiber to the plug connection hole of the receptacle from the outside of a building. Further, since the received state of the receptacle is retained by the retaining means of the pop-up mechanism, and the receptacle 3 can be projected to the front side by the pressing means when the retaining by the retaining means is released, it is possible to easily receive and retain the receptacle 3 in the plug receptacle main body 1 and to easily draw the receptacle 3 to the outside of the plug receptacle main body 1. FIGS. 4A and 4B are external perspective views of the wiring device for optical fiber at the used state and at the non-used state, respectively. FIG. 5 is an external perspective view of the wiring device for optical fiber as seen form the rear side.

Hereinafter, a construction method of mounting the wiring device for optical fiber according to the present embodiment on a mounting hole of a flush box (not shown) buried in the wall such as a wall panel or a concrete wall which is opened in the outer surface of a building, will be described.

First, the front part of the plug receptacle main body 1 is inserted into the aperture 81 of the mounting frame 8 from the rear side, the two hooking frame pieces 88 protruding from each of the rear edges of the side pieces 83,83 of the mounting frame 8 are inserted into the hooking protrusions 12a formed on outer side surfaces of the side walls 11a, 11a of the plug receptacle main body 1, and the rear-side piece of the hooking frame piece 88 is elastically deformed to be hooked at the recess 12b formed at the rear edge of the hooking protrusion 12a, thereby the plug receptacle main body 1 is fixed to the mounting frame 8 (refer to FIGS. 8A and 8C).

Next, the first plug 103 for optical fiber disposed at the leading end of the core wire 102 exposed by peeling off the clad of the optical fiber cable is introduced into the plug receptacle main body 1 through the notch 14 formed at the upper side wall 11b of the plug receptacle main body 1 (refer to FIG. 8B). Here, the optical fiber is wired to the inside of the building (in case of the wall panel, in the wall at the rear side of the wall panel, and in case of the concrete wall, in the concrete wall) and is introduced into the flush box buried in the wall. Then, the first plug 103 is inserted into the opened first plug connection portion of the receptacle that is maintained by the cover 2 and is connected to the receptacle 3. Here, since the receptacle 3 is attached to the cover 2 such that the first plug 103 for optical fiber is obliquely and downwardly inserted from the upper side to the lower left position in FIG. 8B, and the notch 14 for inserting the first plug 103 for optical fiber is formed in the upper side wall 11b of the plug receptacle main body 1 located in insertion direction of the first plug 103 for optical fiber, so that the first plug 103 for optical fiber can be inserted into the receptacle 3 through the notch 14. And, by this construction, the plug insertion operation is not obstructed by the sidewall 11b of the plug receptacle main body 1, so that it is possible to easily perform the insertion operation. Therefore, the operability thereof is enhanced. Further, the receptacle 3 is attached to the cover 2 at a state in which the insertion hole of the plug connection portion is backwardly inclined with respect to the front surface of the plug receptacle main body 1, so that the first plug 103 for optical fiber can be inserted obliquely and downwardly with respect to the receptacle 3 from the upper side thereof as shown in FIG. 8B. Therefore, the insertion of the first plug 103 for optical fiber is further easily performed.

As described above, after the first plug 103 for optical fiber is connected to the receptacle 3, the retainer 6 is attached to the rear part 11d of the plug receptacle main body 1, and the core wire 102 of optical fiber attached to the first plug 103 for optical fiber is inserted into a guide groove 65 through the lower part of the pressing piece 66 of the retainer 6 and is backwardly drawn from the rear end of the guide groove 65. In the attachment of the retainer 6, each hooking pieces 64a formed on the front surface of the retainer 6 is hooked to each of holding grooves 17a of the supporting portions 17 integrally formed on the rear left and right sides of the rear part 11d from the lower ends of the holding grooves 17a, and the hooking protrusion 64b formed on the rear surface of the hooking piece 64a is hooked to the hooking recesses 17b formed on opposing surfaces in the supporting grooves 17a, so that the hooked state of the hooking pieces 64a is retained and the retainer 6 is attached to the rear part 11d of the plug receptacle main body 1.

In the winding process of winding the optical fiber cable backwardly drawn from the guide groove 65 of the retainer 6 to the winder, leading end (end portion of peeled out clad) of the clad of the optical fiber cable is maintained between the outer circumferential surface of the winding body 50 and the protruding pieces 53,53 (the clad retaining portion), the core wire 102 of the optical fiber is introduced to the winding part between the flange 51 and the flange 52 through an interval between the protruding piece 53 and the drawing wall 56a or 56b, and the core wire 102 of the optical fiber is wound on the winding part. This winding process is performed while the knob 58 formed on the front surface of the winding body 50 is gripped by hand.

Figure 7:
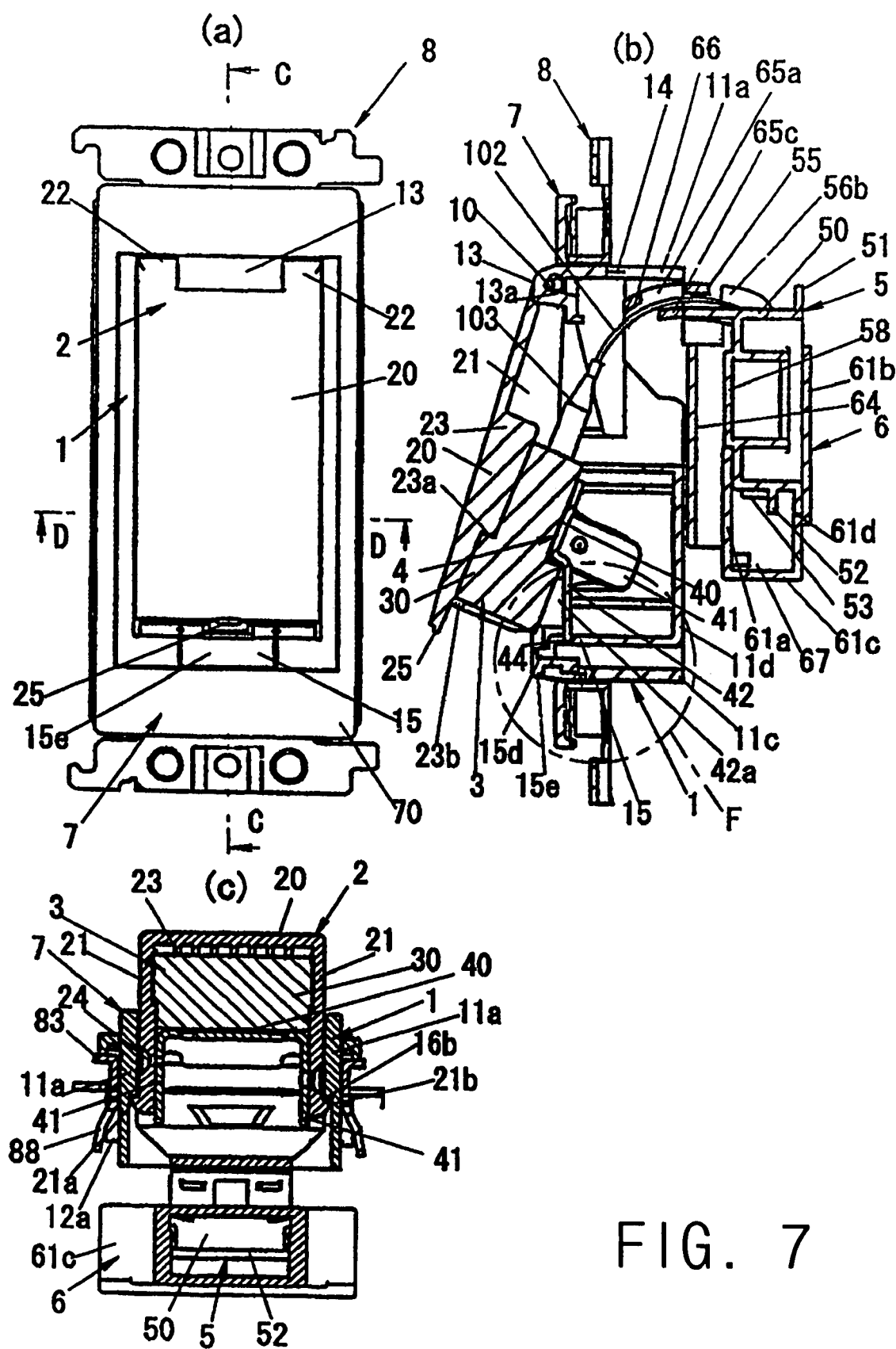
Figure 8:
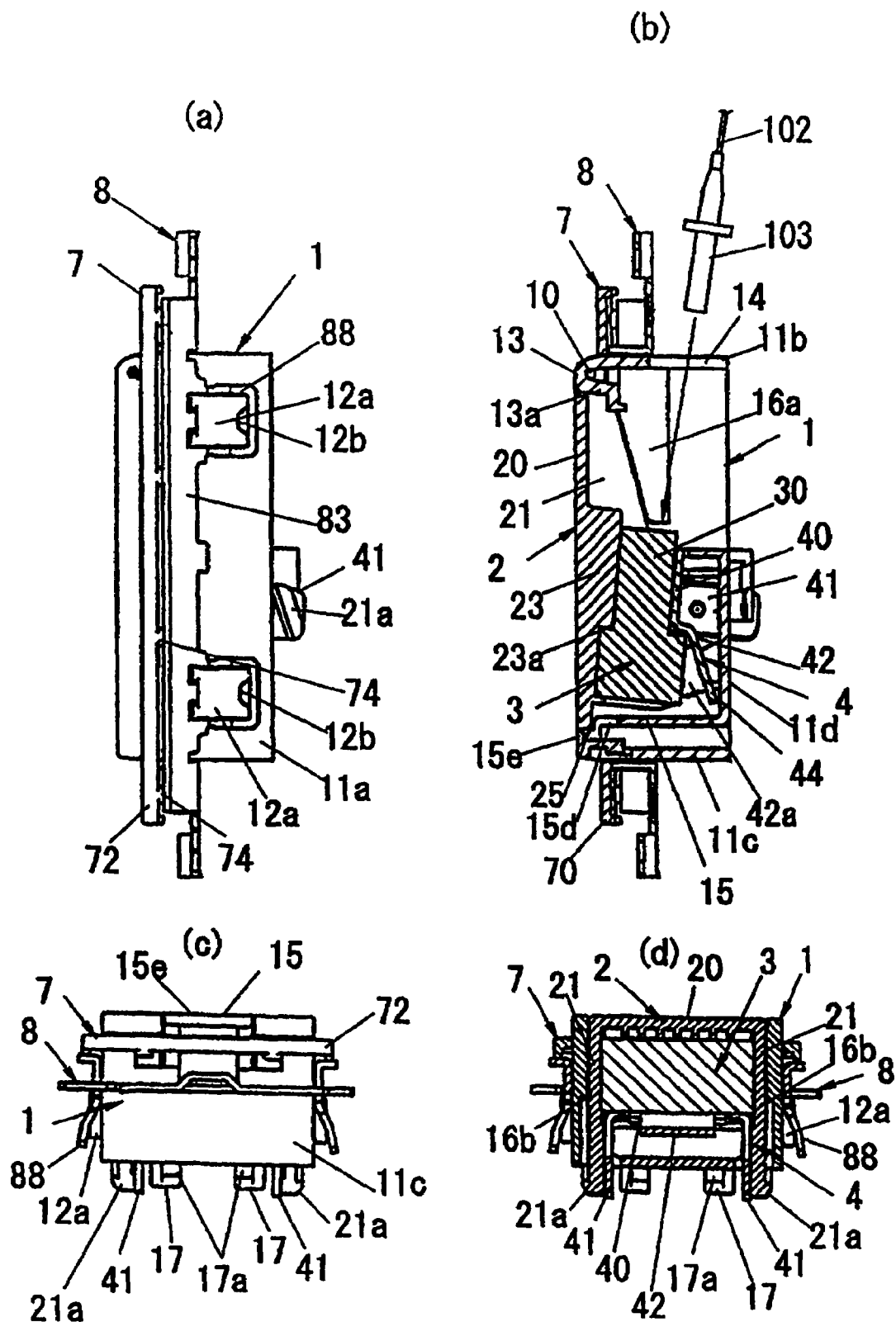
FIGS. 8A to 8D are views illustrating a state in which a retainer of wiring device for an optical fiber according to an embodiment of the present invention is detached, in which 8A is a right side view, 8B is a sectional view of the right side, 8C is a bottom side view, and 8D is a sectional view of the bottom side.
Figure 9:
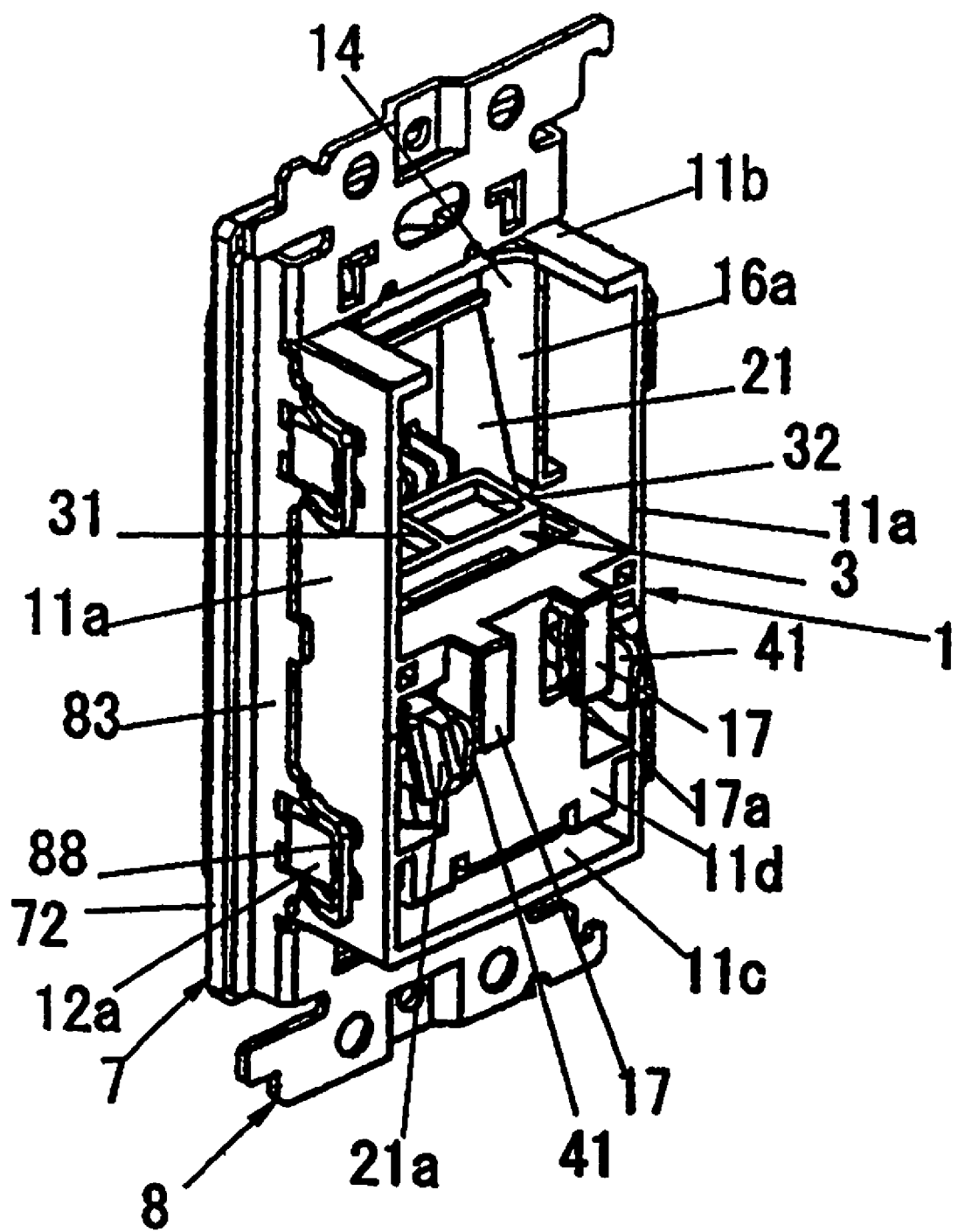
FIG. 9 is an external perspective view illustrating a state in which a retainer of wiring device for an optical fiber according to an embodiment of the present invention is detached as seen from a rear side.
Figure 10:
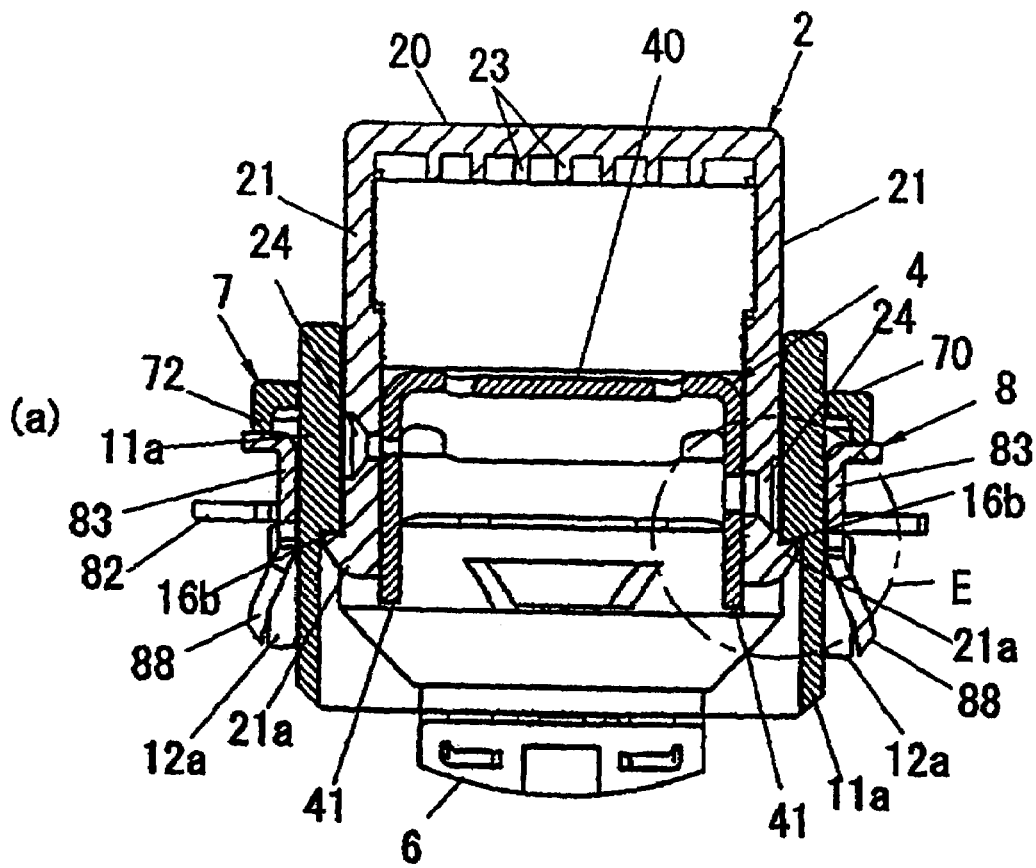
Figure 10:
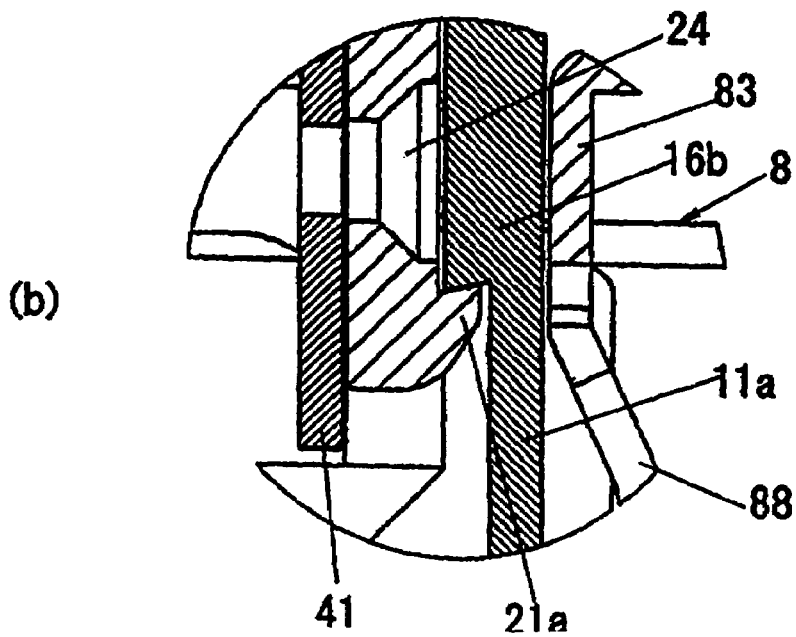
Figure 11:
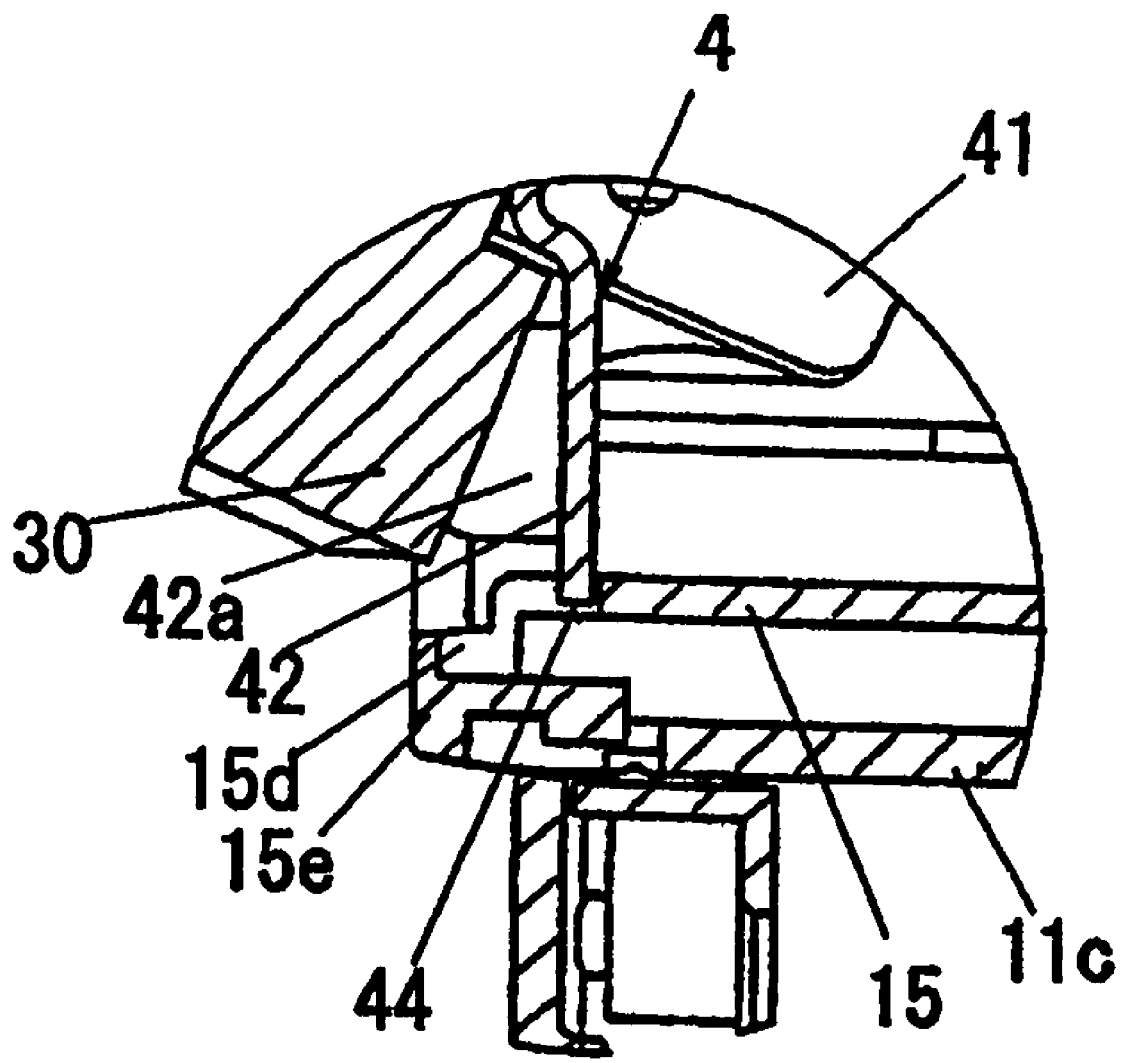
FIG. 11 is an enlarged view of 'F' section of FIG. 7B illustrating wiring device for an optical fiber according to an embodiment of the present invention.

When the remaining length of the core wire 102 of the optical fiber is short, after core wire 102 of the optical fiber is drawn from the interval between the protruding piece 54 and the pressing piece 55 to the outside through the drawing groove 57, the winder 5 is inserted into the receiving portion 62 of the retainer 6 and is maintained in the retainer 6 as shown in FIGS. 6 and 7. Further, when the winder 5 is inserted, the knob 58 is guided by interlocking with the guide groove 63 formed in the side wall 61a of the retainer 6, so that the winder 5 can be easily inserted in the retainer 6, and the winder 5 can be received and maintained in the receiving portion 62 in the normal direction. Further, the winder 5 is received and maintained in the normal direction, so that the front end of the drawing groove 57 and the rear end of the guide groove 65 of the retainer 6 are communicated with each other, thereby the drawing groove 57 and the guide groove 65 constitute a guide path guiding the core wire 102 of the optical fiber. Further, when the winder 5 is inserted until the lower edge of the winding body 50 in the receiving portion 62 contacts the stepped portion 61d of the inner surface of the side wall 61b, the hooking recess 59 formed on the front end surface of the winding body 50 is hooked to a hooking protrusion (not shown) formed on the side wall 61a, so that the winder 5 is prevented from being pulled out. Further, when the hooking protrusion of the sidewall 61a is hooked to the hooking recess 59, the hooking process is easily performed by the elasticity of the sidewall 61a and the tapered surface formed at the lower side of the hooking recess 59.

Further, after the winder 5 is maintained in the retainer 6 attached to the plug receptacle main body 1, the retainer 6, the rear part of the plug receptacle main body 1, and the remaining portion of the clad of the optical fiber cable is received in the flush box 91, and an attaching screw (not shown) are fixed to tapped holes (not shown) of the flush box using elongated holes 84 formed in the upper and lower frame pieces 82 of the mounting frame 8. Then, the elastic hooking pieces 73 of the decoration cover 7 are hooked to the hooking recesses 12c of the plug receptacle main body 1 to attach the decoration cover 7 to the front surface side of the plug receptacle main body 1, then a decoration plate (not shown) is attached to the front surface side of the mounting frame 8 by a engagement claw or a screw. By this decoration plate, the attaching holes and the mounting frame 8 are covered, and front portions of the plug receptacle main body 1 and decoration cover 7 are outwardly exposed from an opening of the decoration plate, thereby the construction is finished.

According to a first aspect of the invention, a notch for inserting the optical fiber plug is formed at a portion of the plug receptacle main body which is located in the inserting direction of the optical fiber plug inserted into and connected to the plug connection portion, so that it is possible to insert the optical fiber plug in the receptacle for optical fiber through the notch, and the insertion operation of the optical fiber plug can be easily performed, which enhances the workability.

According to a second aspect of the invention, the receptacle for optical fiber is attached to the plug receptacle main body, with an insertion hole of the plug connection portion being backwardly inclined with respect to the front surface of the plug receptacle main body, so that it is easy to insert an optical fiber plug attached to the optical fiber which is wired in the rear surface side of a building into the plug connection portion.

According to a third aspect of the invention, since the receptacle for optical fiber is attached to a rotatable retainer which is rotatably supported to the plug receptacle main body, so that at non-used state, the receptacle for optical fiber is received in the plug receptacle main body without any obstruction, and at the used state, the receptacle for optical fiber is projected, thereby an optical fiber plug can be easily connected to a plug connection hole of receptacle for optical fiber from the outer surface side of a building. Further, since the rotatable retainer can be retained in a received state by retaining means of a pop-up mechanism and the rotatable retainer for optical can be projected to the front side by a pressing means when the maintenance by the retaining means is released, so that the receptacle for optical fiber can be easily received and maintained in the plug receptacle main body, or can be easily projected to the outside of the plug receptacle main body.

According to a fourth aspect of the invention, at a projected state, since a hooking portion of a pressing plate attached to the rotatable retainer is hooked to a hooked portion of the plug receptacle main body and the projected state is maintained, when an optical fiber plug is connected to a plug connection hole from the outer surface side of a building, the position of the plug connection hole is hardly changed. Therefore, the connecting operation of the plug can be easily performed. Further, while the optical fiber plug is connected to the plug connection hole, although force biasing the rotatable retainer to the rear side is applied thereto, the rotatable retainer is not closed and it is possible to prevent the optical fiber plug connected to the plug connection hole from being sandwiched between the rotatable retainer and the plug receptacle main body and being damaged.

According to a fifth aspect of the invention, the pressing member is made of a metal material, so that the projected state of the rotatable retainer can be reliably maintained.

According to a six aspect of the invention, a reinforcing member contacts the rear-side portions of second covering portions in which engagement claws are formed, so that the reinforcing member supports the second covering portions. Therefore, even though external force is applied to the rotatable retainer in the left-right direction, the rotatable retainer is hardly deformed, and the engagement state between the engagement claws and the claws to be engaged is hardly released. Thus, the projected state of the rotatable retainer can be reliably retained.

According to a seventh aspect of the invention, the reinforcing member is made of a metal material, so that the reinforcing member can endure against high force. Therefore, the projected state can be more reliably retained.

According to a eighth aspect of the invention, contact surfaces between the engagement claws provided at the covering portions and the claws formed in the plug receptacle main body to be engaged with the engagement claws are inclined in the direction engaged each other at the time of the forward movement of the rotatable retainer. Therefore, at the protruded state, even though external force moving the rotatable retainer toward the front side is applied, the engagement claws and claws to be engaged is engaged each other, thereby the engagement state of the engagement claws and claws to be engaged is hardly released. Thus, the projected state of the rotatable retainer is more reliably maintained.

Although the exemplary embodiments of the present invention have been described, the present invention is not limited to the above exemplary embodiments, but may be modified in various forms without departing from the scope of the appended claims, the detailed description, and the accompanying drawings of the present invention. Therefore, it is natural that such modifications belong to the scope of the present invention.

The present disclosure relates to subject matter contained in Japanese Application No. 2004-045299, filed on Feb. 20, 2004, the contents of which are herein expressly incorporated by reference in its entirety.

What is claimed is:

1. A wiring device for optical fiber, comprising:
a plug receptacle main body which is mountable in a mounting opening in an outer surface of a building;
a receptacle for optical fiber attached to the plug receptacle main body and having a plug connection hole facing an outer surface side of the building at least at a used state and a plug connection portion into which a first optical-fiber plug attached to an optical fiber cable wired to the inside of the building is inserted and connected, and optically connecting the first optical-fiber plug connected to the plug connection portion and a second optical-fiber plug inserted from the outer surface side of the building through the plug connection hole;
a rotatable retainer to which the receptacle for optical fiber is attached at the rear surface side thereof and rotatably supported to the plug receptacle main body so as to keep in either of a projected state forwardly projecting from the front part of the plug receptacle main body to face the plug connection hole toward the outside of the building or a received state in which the plug connection hole is received in the plug receptacle main body; and a pop-up mechanism including a presser that presses the rotatable retainer to the front side of the plug receptacle main body and a retainer that retains the received state, and projects the rotatable retainer to the front side of the plug receptacle main body by the pressing force of the presser when the retaining by the retainer is released, wherein a notch to insert the first optical fiber plug is formed at a portion of the plug receptacle main body which is located in the inserting direction of the first optical fiber plug inserted and connected to the plug connection portion.

2. The wiring device for optical fiber of claim 1, wherein a pressing member to interpose and retain the receptacle for optical fiber between the rear surface of the rotatable retainer and the pressing member is attached to the rotatable retainer, and a hooking portion hooked to a hooked portion disposed at the plug receptacle main body at the projected state is provided to the pressing member.

3. The wiring device for optical fiber of claim 2, wherein the pressing member is made of a metal material.

4. The wiring device for optical fiber of claim 1, wherein the rotatable retainer includes a first covering portion to which the receptacle for optical fiber is attached at the rear surface side thereof and whose one end is rotatably supported to the plug receptacle main body, and second covering portions being protruded from the rear side of the first covering portion and each covering both the left and right sides of the receptacle for optical fiber, the rotatable retainer further including:

engagement claws, which are formed on the out-side surfaces of the second covering portions, regulating the forward movement of the first covering portion on engaging with claws formed in the plug receptacle main body at the projected state; and a reinforcing member contacting the rear side portions of the second covering portions and supporting the second covering portions.

5. The wiring device for optical fiber of claim 4, wherein the reinforcing member is made of a metallic material.

6. The wiring device for optical fiber of claim 1, wherein the rotatable retainer includes a first covering portion to which the receptacle for optical fiber is attached at the rear surface side thereof and whose one end is rotatably supported to the plug receptacle main body, and second covering portions being protruded from the rear side of the first covering portion and each covering both the left and right sides of the receptacle for optical fiber, the rotatable retainer further including:

engagement claws, which are formed on the out-side surfaces of the second covering portions, regulating the forward movement of the first covering portion on engaging with claws formed in the plug receptacle main body at the projected state; and contact surfaces between the engagement claws and the claws formed in the plug receptacle main body to be engaged with the engagement claw are inclined in the direction engaged each other at the time of moving forwardly the rotatable retainer.

7. The wiring device for optical fiber of claim 2, wherein the rotatable retainer includes a first covering portion to which the receptacle for optical fiber is attached at the rear surface side thereof and whose one end is rotatably supported to the plug receptacle main body, and second covering portions being protruded from the rear side of the first covering portion and each covering both the left and right sides of the receptacle for optical fiber, the rotatable retainer further including:

engagement claws, which are formed on the out-side surfaces of the second covering portions, regulating the forward movement of the first covering portion on engaging with claws formed in the plug receptacle main body at the projected state; and a reinforcing member contacting the rear side portions of the second covering portions and supporting the second covering portions.

8. The wiring device for optical fiber of claim 3, wherein the rotatable retainer includes a first covering portion to which the receptacle for optical fiber is attached at the rear surface side thereof and whose one end is rotatably supported to the plug receptacle main body, and second covering portions being protruded from the rear side of the first covering portion and each covering both the left and right sides of the receptacle for optical fiber, the rotatable retainer further including:

engagement claws, which are formed on the out-side surfaces of the second covering portions, regulating the forward movement of the first covering portion on engaging with claws formed in the plug receptacle main body at the projected state; and a reinforcing member contacting the rear side portions of the second covering portions and supporting the second covering portions.

9. The wiring device for optical fiber of claim 7, wherein the reinforcing member is made of a metallic material.

10. The wiring device for optical fiber of claim 8, wherein the reinforcing member is made of a metallic material.

11. The wiring device for optical fiber of claim 2, wherein the rotatable retainer includes a first covering portion to which the receptacle for optical fiber is attached at the rear surface side thereof and whose one end is rotatably supported to the plug receptacle main body, and second covering portions being protruded from the rear side of the first covering portion and each covering both the left and right sides of the receptacle for optical fiber, the rotatable retainer further including:

engagement claws, which are formed on the out-side surfaces of the second covering portions, regulating the forward movement of the first covering portion on engaging with claws formed in the plug receptacle main body at the projected state; and contact surfaces between the engagement claws and the claws formed in the plug receptacle main body to be engaged with the engagement claw are inclined in the direction engaged each other at the time of moving forwardly the rotatable retainer.

12. The wiring device for optical fiber of claim 3, wherein the rotatable retainer includes a first covering portion to which the receptacle for optical fiber is attached at the rear surface side thereof and whose one end is rotatably supported to the plug receptacle main body, and second covering portions being protruded from the rear side of the first covering portion and each covering both the left and right sides of the receptacle for optical fiber, the rotatable retainer further including:

engagement claws, which are formed on the out-side surfaces of the second covering portions, regulating the forward movement of the first covering portion on engaging with claws formed in the plug receptacle main body at the projected state; and contact surfaces between the engagement claws and the claws formed in the plug receptacle main body to be engaged with the engagement claw are inclined in the direction engaged each other at the time of moving forwardly the rotatable retainer.

* * * * *